Dec. 2, 1969   A. J. BRUNNER ET AL   3,481,821
WATERPROOF FABRIC AND METHOD FOR FORMING THE SAME
Filed Oct. 19, 1965
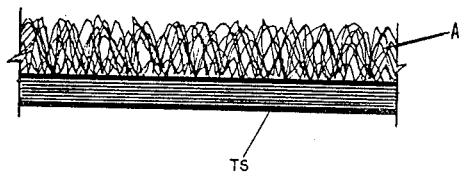
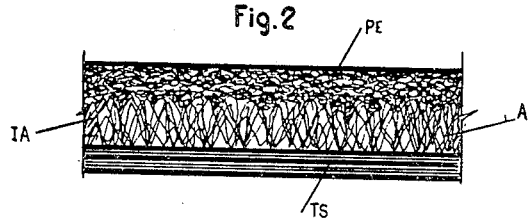
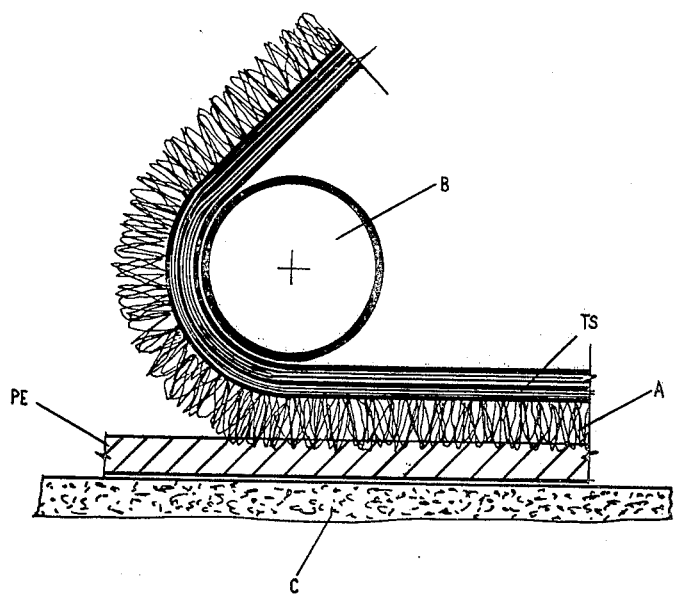
INVENTORS
AUGUSTO J. BRUNNER
FULVIO COSTA
LUIGI FALCONE

3,481,821
WATERPROOF FABRIC AND METHOD FOR FORMING THE SAME

Augusto J. Brunner, Vacallo, Switzerland, and Fulvio Costa, Turin, and Luigi Falcone, Como, Italy, assignors to FLEXA Industria Materie Plastiche S.p.A., Gallarate, Varese, Italy, a corporation of Gallarate, Varese, Italy
Filed Oct. 19, 1965, Ser. No. 497,799
Int. Cl. B32b 3/26, 3/06
U.S. Cl. 161—53    17 Claims

ABSTRACT OF THE DISCLOSURE

A composite material useful for the manufacture of garments comprising a fabric base in the form of a runproof knitted fabric of natural, artificial and synthetic fibers, air cells obtained through loops defining a raised surface of the fabric and being an uninterrupted continuation of the fabric and a water-proof layer or film formed by an elastomeric material disposed upon the crest of the loops but spaced apart from the base fabric. Methods for making the composite material are described.

---

The present invention relates to a composite material formed of a fabric and an elastomer. Such material is useful for the manufacture of garments and other articles adapted for protective and/or sporting uses. This material is characterized by the fact that the elastomer, in film or layer form, is separated from the fabric by means of air cells and yet is secured to the fabric in a flexible manner.

The invention further relates to a method for the preparation of the foregoing composite material.

The water-proofing of textiles has heretofore been effected by the use of water repelling substances or by coating and coupling with synthetic or rubber materials. It has been noted that the use of water repellants has not resulted in lasting waterproofing. Thus, the water repellant substance is gradually removed during long and repeated exposures to violent downpours of water.

The use of various polymeric thermoplastic or elastomeric water-proofing agents results in certain disadvantages. Thus, fabrics tend to become rigidly fixed with such organic polymers and lose their characteristic elastic and softness characteristics. The resulting product usually acquires stiffness or elastic properties characteristic of the substance with which the fabric has been treated and the garment becomes "cold." Therefore, the use of plastified or rubberized garments in direct contact with the body is not feasible, although this would be desirable in many cases, e.g., in the case of garments for seafaring people or for use in tracksuits for sporting activities. Furthermore, the thus treated fabrics acquire characteristics derived from the particular type of polymer used.

With thermoplastic resins characterized by a second order transition temperature of notably higher than atmospheric temperature, flexibility is obtained by an abundant use of plasticizer. However, in these conditions the rubber-glass transition temperature never is so low as to hinder transition from the vitrous state at temperatures normally reached in the winter months.

Moreover, those micro-molecular plasticizers which are most suitable for lowering the second order transition temperature normally exhibit the phenomenon of outward or surface migration, and therefore there occurs a progressive stiffening.

The inconvenience of having the flexibility vary with time and with temperature can be eliminated by replacing thermoplastic polymers with elastomeric or rubbery substances.

The latter reach the vitrous state only at very low temperatures, generally far less than the temperatures encountered under usual atmospheric conditions. The rubbers which are best suited for this purpose are, however, of the diene type, and are therfore easily degraded by the action of light and oxygen. These degradations are accompanied by stiffening and cracking and therefore, in time, by a decrease in flexibility and water-proofness.

Consequently, heretofore no one has succeeded in preparing a material which combines the softness characteristics of a fabric with the flexibility and waterproofness of an elastomer.

One aspect of the present invention is a composite material free from the previous disadvantages and characterized by an absolute consistency of flexibility, softness, and waterproofness, with time.

Another aspect of this invention is the provision of a composite material in which coupling of two components, fabric and elastomeric film, is indirectly effected by means of air cells, whereby the composite material exhibits the desirable characteristics of each of the two components without the presence of one impairing or reducing the properties of the other. Thus, the composite material exhibits the softness of the fabric base and yet also exhibits the attributes of elasticity, resistance to external agents and abrasion, waterproofness, and air and vapor permeability, characteristic of the elastomeric film.

Our invention will become apparent from the following detailed description taken in conjunction with the drawing wherein:

FIG. 1 is a schematic longitudinal profile view and shows our fabric base with loops protruding thereabove;

FIG. 2 is a schematic longitudinal profile view showing a rubbery layer bonded to the crests of the loops and spaced from the fabric base; and FIG. 3 schematically illustrates a method of applying the rubbery layer to the loop crests.

The composite material of this invention comprises:

(A) A fabric base, desirably in the form of a runproof knitted fabric of natural, artificial or synthetic fiber;

(B) Air cells obtained via loops which define a raised surface of the fabric and are an uninterrupted continuation of the fabric; and (C) A waterproof layer or film formed by an elastomeric material, which layer is disposed upon the crests of the loops but is spaced from the base fabric and is "floating" upon it.

According to a further aspect of the invention, the runproof knitted fabric and the continuous loops protruding out from it consist of multi- and/or parallel filament yarn with a low number of twists per meter and desirably having a weight from of about 20 to 250 denier.

The yarns making up the fabric and loops may either be formed from polymeric materials such as polyolefins, polyamides, polyurethanes, or polymers or copolymers of vinyl chloride, acrylonitrile, or tetrafluoroethylene. These yarns may also be formed from cellulose acetate or triacetate, or of silk. Also a terry cloth (cotton fiber) may be employed provided that the loops are constructed so as to remain upright.

According to yet another aspect of the invention, the series of loops of the intermediate layer is formed by a runproof knitted fabric obtained on a chain loom with an appropriate movement of the comb through a recognized "raising" textile finishing process, whereby the yarns may be extracted out of the plane of the fabric without being broken.

One of the essential characteristics of the invention is that the elastomeric film be formed from a material selected from the group consisting of chlorosulphonated polyethylene or polypropylene, ethylene-propylene copolymers, ethylene-propylene-unsaturated monomer terpolymers, copolymers of isobutylene with small quantities of isoprene, butadiene-acrylonitrile copolymers, polyurethanes, nitrile or polysulphide silicon rubbers, polyfluorinated olefins, and chloroprene.

To these polymers or copolymers there may be added pigments and/or dyes, stabilizers, reticulating agents, organic or mineral reinforcing fillers, dispersion promoters, vulcanization accelerators, etc.

Depending upon the particular end application to which the composite material is destined, one can utilize a film with a greater or smaller resistance to abrasion, porosity, flexibility, etc. so as to have, in all cases, the best of the desired properties by appropriate selection of fillers and other ingredients of the mixtures, whether vulcanizable or non-vulcanizable.

The invention also comprehends the resultant articles, manufactured goods and garments, such as overalls, jackets, tents, clothing, furnishing, etc. made with our composite material.

The composite material of our invention is prepared by a method comprising preparing a runproof knitted fabric base of natural, artificial or synthetic fibers, extracting from such fabric a series of protruding loops which represent an uninterrupted continuation of the fabric yarns, and applying to the crests of such loops a film of an elastomeric substance, such film being spaced from the fabric base and "floating" upon it.

To form the intermediate layer a fabric is employed that is made up of multi- and/or parallel filament yarns, desirably having a low number of twists per meter and having a weight of from about 20 to 250 denier. By working on a chain loom with an appropriate movement of the comb by means of a "raising" textile finishing process, extraction of the yarns out of the plane of the fabric is obtained without breaking the yarns. The elastomeric film is then secured to the tops of these loops.

The volume between the film and the underlying fabric base is occupied by air, which thus creates ideal cells. These cells cause the elastomeric film to float on the fabric, thus enhancing the softness and lightness of the whole. Moreover, the air cells also serve as thermal insulation.

The independent relative mobility of the layer formed by the fabric and that formed by the elastic film allows, according to the normal strains imposed by movements of the human body, the individual softness of the fabric and the individual elasticity of the elastomeric material each to be conferred to the garments.

We have succeeded in imparting to the elastic film an appropriate permeability to air and vapor, and this constitutes another aspect of this invention. The ability of a garment to permit to evaporate moisture produced as perspiration of the human body is an important characteristic thereof. In the case of fabrics and garments in general, this evaporative ability is related to water permeability.

The elastic film, in accordance with a further aspect of this invention, although comprising a water repellent material, may have a finite porosity such that it is permeable to gases and vapors, yet is at the same time impermeable to liquid water. This unusual attribute is obtained by fixing to the fabric loops a rubbery film obtained from a very fine suspension of rubbery polymer in a suitable medium. A subsequent treatment carried out under heat and pressure results in the bonding of the various rubbery particles to produce a rubbery matrix layer that has a finite porosity.

The presence of appropriate reticulating agents can determine during this phase, if desired, the degree of reticulation of the elastomer used. As a consequence, the film acquires all of the advantages noted and which result from such a treatment.

The rubbery polymer should be an elastomer having a high resistance to degradation from atmospheric agents.

The application of the elastomeric film to the surface defined by the loop crests may be carried out by direct spreading with a blade or indirectly by padding rollers. In accordance with one preferred aspect of the invention, an elastomeric film is prepared on a non-adhesive material (e.g., paper or cloth provided with an anti-adhesive layer such as a silicone or polytetrafluoroethylene layer) or on a metallic plate and is then transferred on the tops of the loops of the fabric with appropriately adjusted rollers.

Referring to the drawing, FIGURE 1 shows a part of fabric supplied with loops. The loops are the uninterrupted continuation (i.e., the raising up) without discontinuity of the yarns of the fabric TS. That is, the loops are not obtained from stumps of broken, split, protruding or raised yarns that would (1) weaken the fabric base and (2) would not provide an electric cushion for the upper film.

Surprisingly it has been found that only a compact series of loops in the form of semi-ellipses and semi-circles or reverse parabolas, each obtained by a continuous lengthening of the yarns, permits a satisfactory indirect fixing of the elastomeric film to the fabric with the creation of the air cells. Thus, the continuous thread loop layer is not to be confused with either disorderly crimping which can be obtained with voluminous yarns, or with slipping of the yarns.

It is important that the loops (also including, in this term, so-called "hairs," in particular those thickly deposited by mechanical or electrical methods so as to obtain "flocked" fabrics) be vertically erect for a length of preferably from about 25 to 200 microns so as to support the floating elastomeric film.

It should be noted that "flocked" fabrics are the only ones which show characteristics corresponding to those of the other looped fabrics of our invention.

If desired, rugosity or wrinkling can be imparted to the elastomer film so as to make it similar to skins or natural leather by means of conventional devices, e.g., by shrinking the fabric after the film has been coupled thereto, or by mechanical crimping.

FIG. 2 shows elastomer film PE disposed upon and adhered to the envelope or surface of the crests of the loops A, giving rise to air cells IA because it does not come into direct contact with the fabric TS. A consequence of such structure is that when blowing air upon the elastomeric film side (if such film is not porous), no passage of air therethrough occurs. Yet air will pass if it is blown from the knitted base side. That is, the air will pass through the fabric and expand into the cells IA created by the elastomeric film PE and the base fabric TS.

FIG. 3 illustrates a preferred method for fixing the film PE (preformed on a non-adhesive base C) to the fabric TS supplied with loops A by an appropriately set roller B.

Our invention will now be illustrated by the following non-limitative examples. All parts are by weight unless otherwise stated.

(A) PREPARATION OF ELASTOMERIC FILMS

Example 1

90 gm. of a linear polyester of diethylene glycol and adipic acid, having a molecular weight of 1500–2000, were mixed with 190 gm. of a mixture consisting of 80% metatolyl-diisocyanate and 20% para-tolyl-diisocyanate (for example the commercial product known by the name Nacconate 80) with stirring and in a moisture-free atmosphere. The reaction was carried out for about 1 hour, progressively raising the temperature up to 80° C. A 50:50 solution of the reaction product in a dry aromatic solvent (benzene, although toluene, xylene or the like could also be employed) was prepared and a catalyst consisting of N-ethyl morpholine (in an amount equal to 1.5% of the polyester and diisocyanate mixture) was added. Then a thin layer of the product was spread on silicone-treated paper and, after evaporation of the solvent by heating to about 100° C., an elastic and transparent film was obtained having the follow mechanical properties:

Tensile strength _____ kg./cm.$^2$__ 180
Elongation _____ percent__ 600
Elasticity modulus, at 300% _____ kg./cm.$^2$__ 20

Example 2

Utilizing the procedure of Example 1, there was also added, before the catalyst, pigments in an amount of 4–20 parts per 100 parts of polymer, for the purpose of imparting a desired color. A colored elastic film was obtained similar to that of Example 1.

Example 3

100 gm. of an ethylene-propylene copolymer, containing 55 molar percent propylene and having a viscosity ML (1+4) at 100° C. of 45, were worked up in a roll mixer with additions of 2 gm. benzoyl peroxide and 0.2 gm. sulfur. The mixture was then dissolved in heptane so as to result in a 15% solution of the elastomer. 100 cc. of the solution was treated with 50 cc. acetone while stirring to produce a very fine suspension of polymer in the swollen state. This suspension was spread on a paper (rendered anti-adhesive by treatment with silicones or polytetrafluoroethylene) and the film was first immersed in acetone in order to eliminate most of the heptane and to coagulate the polymer, then in water to elaminate acetone. A complete elimination of the solvent was carried out by steam treatment at 100° C. for a few minutes. By successive treatment with steam under pressure for 15 minutes at 160° C. a vulcanized, elastic film was obtained, which film was permeable to air and steam but was impremeable to liquid water.

Example 4

The procedure was the same as described in Example 3, however utilizing a solution having the following composition:

| | Parts by weight |
|---|---|
| Ethylene-propylene copolymer | 100 |
| Silicic acid | 10 |
| Titanium dioxide | 5 |
| Diallyl maleate | 3 |
| Sulfur | 0.2 |
| Benzoyl peroxide | 2 |

Proceeding as in Example 3, an elastic film was obtained which film was permeable to vapors and air but was impermeable to liquid water. The film exhibited the following mechanical properties:

Tensile strength _____ kg./cm.$^2$__ 50
Elongation _____ percent__ 450
Modulus at 300% _____ kg./cm.$^2$__ 35

The use of fillers permits the varying of mechanical properties and the obtaining of higher abrasion resistance in the elastic film, according to the specific end applications desired.

The permeability of water of the elastomeric film, determined according to the method ASTM D 583–58 (e.g., following the method in succeeding section C), which film is bonded to runproof knitted polyamide fabric with 30 denier yarns (e.g., prepared according to the method described in B), is such that water does not pass until there is a 180 cm. height of the hydrostatic column.

The permeability to steam has been evaluated by the following method. A vessel containing water hermetically sealed by the elastomer film being tested, is disposed in a vessel containing anhydrous calcium chloride. The quantity of water which passes through the membrane is evaluated by the variation in weight of the vessel containing water. In the case of our elastomeric film, we found a water-vapor transfer corresponding to 4–5 milligrams water per 100 m.$^2$ per hour. A similar experiment carried out by substituting the elastomeric film of natural leather, material known to be highly transpirable, shows a water-vapor passage of 6–8 milligrams per hour.

Example 5

The procedure was similar to that of Example 4, however substituting for diallyl maleate various other vinyl unsaturated products, either monomeric such as methacrylate esters of polyethylene-glycol, triallyl-cyanurate, triallyl-aconite, maleic anhydride, diallyl-itaconate, or polymeric such as polybutadiene with 1–2 enchainments (Buna 32, Buton 100, etc.), which results in a higher grade of reticulation and gives the film a higher resistance to scratching and abrasion.

Examples 6–8

Other elastic films have been produced using mixtures based on nitrile rubber (e.g., Hycar 1042), butyl rubber

TABLE 1

| Ingredient | Example 6 | Example 7 | Example 8 |
|---|---|---|---|
| Nitrile rubber [1] | 100 | | |
| Butyl rubber [2] | | 100 | |
| Chloroprene [3] | | | 100 |
| Stearic acid | 1 | | |
| Polyterpene resin | 10 | | |
| Dibutyl-phthalate | 10 | | |
| Zinc oxide | | 5 | |
| Carbon black SRF | 65 | | |
| Tetramethyl thiuram monosulfide | 0.3 | | |
| Sulfur | 1 | 2 | 2 |
| Hard kaolin | | 20 | |
| P-quinone-dioxime | | 1 | |
| Glycerine | | 3 | |
| Telluriam diethyl dithiocarbonate | | 1.0 | |
| 2-mercaptobenzothiazole | | 1.0 | |
| Non-staining anti-oxidant | | | 2 |
| Magnesium oxide | | | 4 |
| Heliozone [4] | | | 3 |
| Titanium dioxide | | | 2 |
| Light mineral oil | | | 15 |
| Na-22 [5] | | | 1.5 |
| Mercapto-benzo-thiazol disulfide | | | 1 |
| Retarder W [6] | | | 2 |
| Vulcanization: | | | |
| Time, minutes | 30 | 20 | 20 |
| Temperature, ° C | 150 | 160 | 140 |
| Mechanical properties: | | | |
| Tensile Strength kg./cm.$^2$ | 140 | 150 | 150 |
| Elongation, percent | | 400 | 600 |
| Elasticity Modulus at 300%, kg./cm.$^2$ | | 50 | 50 |
| Hardness, Shore A | 45 | | |

[1] Nitrile rubber, Hycar 1042, Goodrich Chemical Company.
[2] Butyl rubber, Butile 325, Esso Enjay.
[3] Chloroprene-Neoprene W, DuPont.
[4] Heliozone, DuPont.
[5] Na-22-(2 mercaptoimidazole)-DuPont.
[6] Retarder W, DuPont.

(e.g., Butile 325) and chloroprene (e.g., Neoprene W), respectively. Compositions of the mixtures with their respective mechanical properties are reported in Table 1 hereinafter. For the preparation of the films, the technique already previously described is preferred, i.e., making up a solution of the mixture, spreading the solution over an anti-adhesive base, elimination of the solvent, and vulcanization under pressure with steam.

Example 9

An elastomer material consisting of chlorosulfonated polyethylene (S=1.4%; Cl=27%) was worked up in a roller mixer and incorporated with the ingredients reported below:

| | |
|---|---|
| Chlorosulfonated polyethylene | 100 |
| Hydrogenated resin | 2.5 |
| Calcium carbonate | 80 |
| Magnesium oxide | 20 |
| Dipentamethylene thiuramtetrasulfide | 1 |

The product was dissolved in carbon tetrachloride until a 15% elastomer content and then spread on an anti-adhesive base. After elimination of the solvent and vulcanization (30 minutes at 7 atmospheres) the elastomer film had the following properties:

| | |
|---|---|
| Tensile strength, kg./cm.$^2$ | 220 |
| Elongation, percent | 200 |
| Elasticity modulus at 100%, kg./cm.$^2$ | 124 |
| Hardness, Shore A | 77 |

(B) PREPARATION OF THE FABRIC

Although the normal terry fabrics obtained directly in the weaving of natural products (cotton, staple, etc.) are suitable for the realization of our invention, provided they are "squashed up" so as to straighten the loops of the yarns, we shall describe the use of a fabric made from continuous synthetic fibers. Such fabrics, upon an appropriate textile finishing method, become particularly suitable for coupling with elastomeric films to produce the final article of our invention. The textile product is a runproof knitted fabric worked on a chain loom on which, by means of appropriate movement of the comb, a weave is obtained so as to allow the sliding of the yarns when these yarns are stressed under tensiion. The fabric is then submitted to the action of a machine provided with rotating rollers coated with a raising belt. The function of the machine is such that a part of the filaments of the continuous yarns are raised above the plane of the fabric with the consequent formation of a series of loops regularly arranged on the surface of the fabric, without there being any breakage of the single yarns. The number and density of these loops is such that there is formed a new surface arranged substantially parallel to the original plane of the fabric and defined by the crests of the loops. This new surface is, in texture, similar to velvet, is characterized by a marked flexibility, elasticity and continuity owing to the fact that every loop is substantially on a plane perpendicular to the plane of the fabric, and the loops are stable in this position.

This condition would not occur, for example, if, during the process, the raising carried out on the yarns were such as to fracture it and therefore break the continuity of it. In this case, the stump of yarns raised above the fabric would be disposed in an unstable position and therefore would tend to lie down in the plane of the fabric following, for example, compression stress. This fact, besides reducing the elasticity of the new surface, would result in a breakage of its continuity. This would constitute an obstacle to the present invention, which contemplates the deposition of an elastic film, floating on the surface defined by the crests of the loops, and therefore being arranged on a plane substantially parallel to that of the fabric. The yarns which constitute the knitted fabric desirably have a weight of from about 20 to 250 denier and may be multi- and/or parallel filament. Desirably, these yarns contain from about 20 to 30 turns (twists) per meter.

(C) COUPLING OR BONDING

The coupling or bonding of the fabric to the elastomeric film may be effected using any of the known means for this purpose. A preferred method resides in disposing the elastomeric film on an anti-adhesive base and then coupling the film to the fabric. The base on which the film is spread must have anti-adhesive properties. This can be imparted to paper or fabrics by coating with a silicone, with Teflon, etc., which acts as an anti-adhesive agent.

Referring to FIG. 3, the fabric is with the loops A arranged outwards, is bonded, by application of roller B, to the film PE disposed on the base C. The distance between the roller B and the elastomeric film PE is regulated so that only the tops of the loops A penetrate the film PE. Vulcanization of the film PE, if desired, can be effected after the coupling. It is known that rubber-synthetic fabric bonding may pose a problem of adhesion. This is of technical significance only when using non-polar elastomers, such as, e.g., ethylene-propylene copolymer, butyl rubber, or the like. In these cases, the adhesion can be improved to a satisfactory level by utilizing appropriate techniques already widely described in the literature. For example, excellent results can be obtained by masticating the fabric with solutions of a mixture, the composition of which is the same as that of the elastomeric film to be applied, along with the addition of small amounts of polyisocyanates (1–5%) and condensation products of isocyanic derivatives. Among the former particularly suitable are, for example, triphenylmethane-triisocyanate (corresponding to commercial products of the type Desmodur R) and methylene-bis-diphenyl-diisocyanate (corresponding to the commercial product Hylene M). Although this constitutes a preferred method of our invention, we do not intend to exclude numerous other means known to the field.

(D) APPLICATIONS

Example 10

Proceeding as in C, the coupling of the elastomeric films described in Example 1 and 2 is effected with a runproof knited polyamide fabric made up of yarns of 70 denier, prepared as described in B. The articles obtained are useful for nautical applications, for light, insulating and water-proof fabrics, for tents, and for waterproofing applications in general.

The use of appropriate pigments in the elastomeric mixture enables one to prepare fabrics for white fluorescent waterproofing applications, e.g., for persons attached to a city police force, night duty, etc. Waterproof materials having bright colors, for example, yellow or orange for road maintenance and motorway officials, also for seafaring folk, may also be obtained.

The properties of the composite material so obtained are those of the polyamide fabric base whilst the elasticity, elastomeric material of Examples 1 and 2. Surprisingly, the properties of one component of the combined material is not in the least influenced by the presence of the other component, due to the presence of the air cells therebetween.

Examples 11–13

Proceeding as described in Example 10, films of chloroprene, butyl rubber, and chlorosulfonated polyethylene, respectively (according to Examples 7, 8 and 9) were used. In each instance there resulted a composite material which exhibited the softness of the polyamide fabric base and the surface properties (impermeability, porosity, resistance to wear and tear, etc.) of the polymeric film.

Examples 14–15

Proceeding as described in C, the coupling was carried out between the elastomeric films described in Examples 3 and 4 using a terry fabric of very hydrophilic cotton. Suitable articles were obtained for the manufacture of garments to wear after bathing, or for extremely cold and very windy climates, due to the fact that the base absorbs the body moisture which is then eliminated through the upper porous elastic film.

Examples 16–17

Coupling, as in C, was carried out between the elastomeric films described in Examples 1 and 2 and a runproof knitted polyamide fabric of 40 denier yarns prepared as described in B. Articles were obtained of particular lightness, e.g., for mountaineering garments which, in not hindering movement, offer protection yet are suitable even at very low temperatures.

Examples 18–21

Elastomeric films consisting of polyurethanes (Example 2), ethylene-propylene copolymer (Example 4), butadiene-acrylonitrile copolymer (Example 6), and chlorosulfonated-polyethylene (Example 9), were coupled, as in C, with a runproof knitted polyamide fabric of 60 denier yarns, prepared as described in B. The composite materials obtained were suitable for the manufacture of overalls and working clothes, particularly in contaminated atmospheres or containing toxic chemicals, due to the particularly chemically resistant properties of the elastomer material used.

Examples 22–28

The elastomeric films described in Examples 1–7, respectively, were coupled, as in C, with a runproof knitted polyamide fabric made of 40 denier yarns treated as in B. Composite materials were obtained that were ideal for coverings of divans, armchairs, chairs and general furnishing use.

Examples 29–33

Similar results to those of Examples 10–13, 16 and 17 were obtained by applying the same elastomeric films to runproof knitted fabrics made of yarns having counts of 80 denier in acrylic fiber (Draclon, Orlon, Leacril) and polyesters (terylene) treated as in B. The coupling was carried out using the method shown in FIG. 3, which method was particularly simple and effective. Composite materials were obtained which were very suitable for a wide variety of applications.

Examples 35–36

Elastomer films of ethylene-propylene copolymers (Examples 3 and 4) were fixed, operating as in C, to a runproof knitted fabric made of multi-filament yarns of 60 denier (poly-propylene, Meraklon), treated as described in B. A composite material was obtained that was very light, tough, and resistant to atmospheric degradative agents. These films were also applied to other fabrics (Rhovile, Movil) with similar results to those of the preceding examples, that is, obtaining a composite material in which both the softness of the base fabric and the elastomeric film properties were maintained unaltered as a consequence of the air loops gap.

Variations can of course be made without departing from the spirit of this invention.

Having thus described the invention, what is desired to be secured and claimed by Letters Patent is:

1. A light flexible water-proof composite material comprising a run-proof base fabric, loops upstanding from said fabric, said loops being made up of filaments from said base fabric and being uninterrupted continuations of said base fabric filaments, said loops defining compartments or cells that are adapted to be occupied by air, the crests of said loops defining a surface spaced from the plane of said base fabric, and a waterproof elastomeric film bonded to said crests and being spaced from said fabric base and floating thereupon.

2. The composite material of claim 1 wherein said continuous loops consist of multi-filament yarns having a weight of from about 20 to 150 denier.

3. The composite material of claim 1 wherein said fabric and loops are formed from a material selected from the group consisting of a polyolefin, polyamide, polyester, polyurethane, polymers and copolymers of vinyl chloride, acrylonitrile and tetrafluoroethylene.

4. The composite material of claim 1 wherein the fabric and loops are formed from materials selected from the group consisting of cellulose acetate and, triacetate, and silk.

5. The composite material of claim 1 wherein the fabric and loops consist of terry cloth made up of cotton fibers.

6. The composite material of claim 1 wherein the loops are formed from fibers which have been pulled out from said base fabric, said loops comprising uninterrupted continuations of the fibers forming the fabric.

7. The composite materials of claim 1 wherein there is disposed an adhesive between said elastomeric film and said crests of said loops.

8. The composite material of claim 1 wherein said continuous loops comprise parallel filament yarns having a weight of from about 20 to 150 denier.

9. The composite material of claim 1 wherein the elastomeric film is a material selected from the group consisting of a chlorosulfonated polyethylene, a chlorosulfonated polypropylene, an ethylene-propylene copolymer, an ethylene-propylene-unsaturated monomer terpolymer, a copolymer of isobutylene with a small amount of isoprene, a butadience-acrylontrile copolymer, a polyurethane, a nitrile rubber, a silicone rubber, a polysulfide rubber, a polyfluoronated olefin, and chloroprene.

10. The composite material of claim 9 wherein the elastomeric film contains an additive selected from the group consisting of a pigment, dye, reticulating agent, organic reinforcing filler, mineral reinforcing filler, vulcanization stabilizer, accelerator, and dispersion promoter.

11. The composite material according to claim 1 characterized by a high lightness, flexibility, elasticity, softness, water-proofness, chemical resistance, and abrasion resistance.

12. The composite material of claim 11 wherein said elastomeric film is porous to gases and vapors, whereby said composite is permeable to gases and vapors.

13. A method of preparing a light flexible water-proof composite material from a knit fabric base made up of a plurality of filaments, this method comprising pulling out from said fabric base a plurality of filaments to form a series of protruding loops without breaking said filaments so that said loops represent an uninterrupted continuation of the filaments of said fabric, the crests of said loops defining a surface substantially parallel to said base fabric, and bonding to said crests an elastomeric film, whereby said film is spaced from said fabric base yet is secured thereto through said loops.

14. The method of claim 13 wherein said fabric consists of the fibers selected from the group consisting of multi- and parallel filament yarns having a low number of twists per meter and having a weight from about 20 to 250 denier, said loops being formed by means of a chain loom in conjunction with a comb movement whereby the yarns are enabled to slide without breakage when said loops are drawn out by raising.

15. The method of claim 14 wherein said yarns are made from materials selected from the group consisting of synthetic polymers, copolymers, silk, cellulose acetate, triacetate, and cotton.

16. The method of claim 14 wherein said elastomeric film is initially disposed upon an anti-adhesive flat surface, and wherein said elastomeric film is made up of a material selected from the group consisting of polymers and copolymers of ethylene, propylene, isobutylene, butadiene, tetrafluoroethylene, a polysulfide rubber, polyurethane, nitrile rubber, silicone rubber, and chloroprene rubber, and wherein said fabric is passed to said film so that at least the crest of the protruding loops are penetrated by said elastomeric film, and are firmly fixed thereto.

17. The method of claim 16 wherein said elastomeric film contains additives selected from the group consisting of reinforcing fillers, reticulating agents, stabilizers, accelerators, pigments and dyes.

References Cited

UNITED STATES PATENTS

| | | | |
|---|---|---|---|
| 2,268,399 | 12/1941 | Hurt | 161—89 XR |
| 2,533,976 | 12/1950 | Teague | 161—89 XR |
| 2,593,553 | 4/1952 | Francis | 161—89 XR |
| 3,042,564 | 7/1962 | Hankins | 161—53 XR |
| 3,272,685 | 9/1966 | Kagan | 161—49 |

FOREIGN PATENTS

| | | |
|---|---|---|
| 366,864 | 2/1932 | Great Britain. |
| 960,445 | 6/1964 | Great Britain. |
| 1,327,225 | 4/1963 | France. |

ROBERT F. BURNETT, Primary Examiner

W. A. POWELL, Assistant Examiner

U.S. Cl. X.R.

156—230, 289; 161—67, 89, 159

PO-1050
(5/69)

UNITED STATES PATENT OFFICE
CERTIFICATE OF CORRECTION

Patent No. 3,481,821                    Dated December 2, 1969

Inventor(s) Augusto J. Brunner, Fulvio Costa, and Luigi Falcone

It is certified that error appears in the above-identified patent and that said Letters Patent are hereby corrected as shown below:

Column 4, line 16, "electric" should read -- elastic --.
Column 5, after line 5, insert the following line -- Hardness, Shore A ------------ 60 --; line 28, "elaminate" should read -- eliminate --; line 33, "impremeable" should read -- impermeable --. Column 6, line 15, after "to" insert -- a -
Column 7, line 4, change "hereinafter" to -- hereinabove --; line 45, "tensiion" should read -- tension --. Column 8, after line 59 and before line 60, insert the following -- waterproof and porosity properties are those of the --.
Claim 9, line 7, change "butadience-acrylontrile" to -- butadiene-acrylonitrile --.

SIGNED AND
SEALED
JUL 7 1970

(SEAL)
Attest:

Edward M. Fletcher, Jr.
Attesting Officer

WILLIAM E. SCHUYLER, JR.
Commissioner of Patents